(12) United States Patent
Hirano et al.

(10) Patent No.: US 8,861,382 B2
(45) Date of Patent: Oct. 14, 2014

(54) OVERLAY NETWORK NODE

(75) Inventors: Jun Hirano, Kanagawa (JP); Tien Ming Benjamin Koh, Singapore (SG); Chun Keong Benjamin Lim, Singapore (SG); Chan Wah Ng, Singapore (SG); Pek Yew Tan, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 775 days.

(21) Appl. No.: 12/513,269

(22) PCT Filed: Oct. 31, 2007

(86) PCT No.: PCT/JP2007/071596
§ 371 (c)(1),
(2), (4) Date: May 1, 2009

(87) PCT Pub. No.: WO2008/054020
PCT Pub. Date: May 8, 2008

(65) Prior Publication Data
US 2010/0014533 A1    Jan. 21, 2010

(30) Foreign Application Priority Data

Nov. 2, 2006 (JP) .................................. 2006-299683
Mar. 26, 2007 (JP) .................................. 2007-079861

(51) Int. Cl.
| | |
|---|---|
| *H04L 12/26* | (2006.01) |
| *H04W 8/06* | (2009.01) |
| *H04W 8/26* | (2009.01) |
| *H04W 28/02* | (2009.01) |
| *H04W 8/12* | (2009.01) |
| *H04W 88/02* | (2009.01) |
| *H04W 80/04* | (2009.01) |

(52) U.S. Cl.
CPC ................ *H04W 8/065* (2013.01); *H04W 8/26* (2013.01); *H04W 28/02* (2013.01); *H04W 8/12* (2013.01); *H04W 88/02* (2013.01); *H04W 80/04* (2013.01)
USPC ......................................... 370/252; 370/401

(58) Field of Classification Search
None
See application file for complete search history.

(56) References Cited

U.S. PATENT DOCUMENTS 6,195,705 B1    2/2001   Leung
6,275,470 B1 *   8/2001   Ricciulli ........................ 370/238
(Continued)

FOREIGN PATENT DOCUMENTS

WO      2006/068439      6/2006

OTHER PUBLICATIONS

International Search Report dated Feb. 28, 2008.
(Continued)

*Primary Examiner* — Michael J Moore, Jr.
(74) *Attorney, Agent, or Firm* — Dickinson Wright PLLC

(57) ABSTRACT

There is disclosed a technology which improves scalability in an overlay network system and which efficiently supplies a service with respect to a user, and according to the technology, for example, in a case where a mobile node (110) transmits an update message including a specific flow filtering rule to an HA (120) in order to receive a service concerning functions of multiple interfaces, the HA (120) interprets the flow filtering rule, specifies an HA 160 to transfer a data packet from CNs (180, 190), an HA (150) to transfer a data packet from the CN (190) and an HA (140) to transfer a data packet from a CN (1100), and selectively transmits to each HA a message including information useful for the respective HA.

9 Claims, 7 Drawing Sheets

(56) References Cited

U.S. PATENT DOCUMENTS

| | | | |
|---|---|---|---|
| 6,778,502 B2* | 8/2004 | Ricciulli | 370/238 |
| 7,080,151 B1 | 7/2006 | Borella | |
| 7,103,023 B2* | 9/2006 | Sakakura | 370/331 |
| 7,330,908 B2* | 2/2008 | Jungck | 709/246 |
| 7,388,841 B2* | 6/2008 | Shao et al. | 370/238 |
| 7,529,196 B2* | 5/2009 | Basu et al. | 370/254 |
| 7,593,377 B2* | 9/2009 | Thubert et al. | 370/338 |
| 7,876,712 B2* | 1/2011 | Decasper et al. | 370/254 |
| 7,953,888 B2* | 5/2011 | Ricciulli | 709/239 |
| 2002/0064141 A1* | 5/2002 | Sakakura | 370/331 |
| 2004/0114741 A1* | 6/2004 | Ngo et al. | 379/133 |
| 2004/0202135 A1* | 10/2004 | Han et al. | 370/332 |
| 2005/0083848 A1* | 4/2005 | Shao et al. | 370/238 |
| 2007/0115844 A1* | 5/2007 | Basu et al. | 370/252 |
| 2010/0074147 A1* | 3/2010 | Decasper et al. | 370/254 |
| 2010/0085915 A1* | 4/2010 | Hirano et al. | 370/328 |
| 2010/0214998 A1* | 8/2010 | Hirano et al. | 370/329 |

OTHER PUBLICATIONS

R. Wakikawa, et al., "Inter Home Agents Protocol (HAHA)," Internet Citation, [Online], Feb. 16, 2004, XP002331373 Retrieved from the Internet: URL:http://www.mobilenetworks.org/nemo/drafts/draft-wakikawa-mip6-nemo-ha ha-01.txt, Feb. 2004, pp. 1-39.

C. Larsson, et al., "A Filter Rule Mechanism for Multi-access Mobile IPv6; draft-larsson-monami6-filter-rules-00.txt," IETF Standard-Working-Draft, Internet Engineering Task Force, IETF, CH, Jun. 2006, pp. 1-11.

P. Thubert, et al., "Global HA to HA protocol," Network Mobility, IETF, Oct. 2005, pp. 1-24, p. 4, line 14.

* cited by examiner

OVERLAY NETWORK NODE

TECHNICAL FIELD

The present invention relates to an overlay network node which functions as a node of an overlay network where a packet interchangeable data communication network such as an internet protocol (IP) network is abstracted.

BACKGROUND ART

At present, it is an important requirement for a user that a connection property to an internet can be maintained during movement. Especially, a state is demanded in which the user can constantly be connected to the internet even when the user moves to any place. When the user moves between networks, an IP address has to be changed, and a problem concerning this address change is solved by introducing a mobile IP.

Moreover, in a working group of mobile nodes and multiple interfaces in IPv6 (Monami6) of Internet Engineering Task Force (IFTF), with regard to mobile nodes of the multiple interfaces, discussion has been advanced in order to supply such a function that characteristics of multiple modes of the nodes can sufficiently be used.

In the mobile nodes of the multiple interfaces, a plurality of care-of addresses acquired in the interfaces can be registered in a home agent. When the plurality of care-of addresses are registered, the home agent can grasp that the mobile nodes can be reached via a plurality of routes.

When this technology is realized, the mobile node can designate a place where the data packet is to be received. It is possible to stipulate a rule in which the care-of address as a destination of a stream (referred to as a flow) of the data packets to be transmitted is designated.

Moreover, in the IETF, in parallel with the above discussion, a discussion has been advanced so as to supply a technique of optimizing a transmission path of the data packet accompanying movement of the mobile node. It is to be noted that this optimization is performed according to various levels and formats. For example, with regard to optimization of end-to-end between a transmitter and a receiver, a basic standard specification of the mobile IP has already been discussed. On the other hand, for example, with regard to the optimization between a mobile router or the mobile node and the home agent, discussion has been advanced in various working groups such as IETF.

Furthermore, in Non-Patent Document 1 described below, a technique (a technology referred to as global HAHA) concerning the optimization performed in the overlay network is proposed. In the technique proposed by Non-Patent Document 1, path optimization which is transparent to an end user is realized using a network of cooperating routers arranged in a geographically scattered manner.

First, the mobile node of the user registers binding information in the home agent. Then, the home agent distributes this binding information to the other home agents arranged in the overlay network in the geographically scattered manner, and resultantly the other home agents can function as proxy home agents of the mobile node.

The data packet received/transmitted with respect to the mobile node is intercepted by the proxy home agent closest to a transmitter node, encapsulated or decapsulated, and then tunneled by another proxy home agent closest to a destination node. In contrast to such a path reaching the destination node from the transmitter node via an original home agent (the home agent in which the binding information is registered by the mobile node), the path of the data packet is optimized between the transmitter node and the destination node.

Moreover, in Patent Document 1 described below, a technology is disclosed in which when the mobile node is not operated, information on the mobile node is not propagated to the other home agent in the overlay network.

Furthermore, in Patent Document 2 described below, a technology is disclosed in which information of the home agents are multi-cast with respect to all controllers and backup devices (backup home agents) to seamlessly switch an operation to the backup home agents in a system constituted of the home agents and the controllers and backup devices of the home agents.

[Patent Document 1] International Patent Application Publication No. WO2006/068439
[Patent Document 2] U.S. Pat. No. 7,080,151
[Non-Patent Document 1] P. Thubert, et al., "Global HA to HA protocol", Internet Engineering Task Force Internet Draft: draft-thubert-nemo-global-haha-01.txt, Work-In-Progress, 15 Oct. 2005.

However, there are restrictions on a range of the overlay network, and a problem concerning scalability of a technique of Monami6 occurs in, for example, a range and scale in which the overlay network beyond a border of a country and a continent is required.

A capability of a microprocessor is rapidly improving, and it is expected that a user simultaneously plays game, performs voice communication and downloads data so that the mobile node simultaneously communicates with a plurality of communication partners. In this case, each mobile node sets various flow filtering rules concerning processing of flows. However, there is a possibility that each user has a plurality of flow filtering rules. Therefore, when a large number of users are present, very high loads are imposed on memories of the respective network nodes and processing and storage of the rule. Moreover, even in a case where a plurality of paths are distributed to one user terminal in the overlay network, a similar problem concerning the scalability occurs. At present, a technique concerning the optimization of the overlay network is present in this manner, but there is not any solution to a problem in a case where a flow filtering service is supplied in the overlay network.

Furthermore, according to the technology disclosed in Patent Document 1, it is possible to solve, to a certain degree, the problem that as the number of the mobile nodes increases, the loads concerning the flow filtering of the overlay network node rapidly increase, but in actual, a large number of mobile nodes operate and request services. Therefore, in a case where an actual operation is considered, the technology disclosed in Patent Document 1 does not realize a very useful effect.

In addition, the technology disclosed in Patent Document 2 is useful for the operation of the overlay network, but the loads generated owing to an excessive amount of information at each home agent cannot be reduced.

DISCLOSURE OF THE INVENTION

To solve the above-mentioned problems, an object of the present invention is to improve scalability in an overlay network system and efficiently supply a service to a user. Another object of the present invention is to realize reduction of the number of messages to be transmitted in an overlay network and saving of resources (a memory and a processing load) of an overlay network node in a case where a flow filtering rule is updated from multiple nodes capable of using a plurality of flows especially with respect to the overlay network which supplies a flow filtering service.

To achieve the above-mentioned object, an overlay network node of the present invention is an overlay network node which belongs to an overlay network formed at a host of a predetermined network and which has a function concerning a specific overlay network service, the overlay network node comprising:

means for receiving, from a predetermined end node or another overlay network node, a message indicating that the predetermined end node which receives the specific overlay network service requests a function concerning the specific overlay network service;

means for interpreting the request from the end node with reference to information included in the message;

means for selecting the overlay network node to which the information included in the message needs to be distributed based on an interpretation result of the request from the end node; and means for transmitting the information included in the message to the selected overlay network node.

According to this constitution, the number of unnecessary messages (the messages including information useless for a transmission destination) between the overlay network nodes is reduced, scalability of the overlay network system is improved, and a service can efficiently be supplied to a user.

Furthermore, in addition to the above constitution, the overlay network node of the present invention has means for sorting information necessary for the selected overlay network node from the information included in the message, and the node is configured to transmit the information sorted from the information included in the message to the selected overlay network node.

According to this constitution, in addition to the specifying of the overlay network nodes in which the information is to be updated, in each of the specified overlay network nodes, the necessary information is sorted, whereby minimum information only is propagated to an appropriate overlay network node.

Moreover, according to the overlay network node of the present invention, in addition to the above constitution, the message transmitted from the end node which receives the specific overlay network service is a message which requests a service concerning functions of multiple interfaces, and includes a flow filtering rule to designate a processing method of a data packet flow.

According to this constitution, in the service concerning the functions of the multiple interfaces, the flow filtering rule can efficiently be propagated in the overlay network.

Furthermore, according to the overlay network node of the present invention, in addition to the above constitution, the data packet flow is managed based on an index, and an index value to specify the data packet flow and the flow filtering rule to designate the processing method of the data packet flow specified based on the index value are included in the message.

According to this constitution, especially in a case where an index-based flow filtering protocol is used, the present invention can easily be incorporated.

Moreover, in addition to the above constitution, the overlay network node of the present invention is configured to supply the flow filtering rule to the overlay network node to be influenced in a case where the flow filtering rule included in the message is executed in the overlay network.

According to this constitution, the only information on the minimum flow filtering rule is propagated in the overlay network, the overlay network nodes constituting the overlay network retain the only information concerning the flow filtering rule necessary for themselves, and efficiency of the overlay network is realized.

Furthermore, in addition to the above constitution, the overlay network of the present invention has means for judging whether or not additional path information is necessary in order to execute the flow filtering rule included in the message.

According to this constitution, even in a case where the node has the minimum path information only, the path information required for the update of the flow filtering rule can be judged.

Moreover, according to the overlay network node of the present invention, in addition to the above constitution, the message transmitted from the end node which receives the specific overlay network service is a message which requests a QoS assurance service.

According to this constitution, for example, the request from the mobile node is propagated to the only overlay network node along a path which requires QoS assurance, whereby a resource is reserved.

Furthermore, according to the overlay network node of the present invention, in addition to the above constitution, the message transmitted from the end node which receives the specific overlay network service is a message indicating that it is requested that a plurality of packet transmission paths to the end node be set.

According to this constitution, in a service capable of registering the plurality of packet transmission paths, the packet can efficiently be transmitted in the overlay network, and storage resources of the information on the packet transmission paths in the whole overlay network can be saved.

Moreover, in addition to the above constitution, the overlay network node of the present invention is configured to determine the overlay network node to selectively distribute a part of all of the plurality of packet transmission paths to the end node included in the message, and is configured to supply, to the determined overlay network node, information on a part or all of the plurality of corresponding packet transmission paths.

According to this constitution, each overlay network node does not retain redundant information on the plurality of packet transmission paths to the end node, and can retain minimum information on the packet transmission paths to the end node, whereby efficiency of the overlay network is realized.

Furthermore, to achieve the above object, an overlay network node of the present invention is an overlay network node which belongs to an overlay network formed at a host of a predetermined network and which has a function concerning a specific overlay network service, the overlay network node comprising: means for receiving, from a predetermined end node, a message indicating that the predetermined end node which receives the specific overlay network service requests a function concerning the specific overlay network service; and means for transmitting information included in the message to a predetermined overlay network node.

According to this constitution, the number of unnecessary messages (messages including information useless for a transmission destination) is reduced between the overlay network nodes, and scalability in the overlay network system can be improved to efficiently supply a service to a user.

Moreover, according to the overlay network node of the present invention, in addition to the above-mentioned constitution, the predetermined overlay network node is an overlay network node predetermined so as to process the request for the function concerning the specific overlay network service from the mobile node, or a primary home agent of the mobile node.

According to this constitution, it is possible to easily specify the overlay network node which manages the request for the function concerning the specific overlay network service from the mobile node.

The present invention has the above-mentioned constitution, and has an effect that the scalability in the overlay network system can be improved to efficiently supply the service to the user. Moreover, the present invention has an effect that reduction of the number of the messages to be transmitted in the overlay network and the saving of the resources (the memory and the processing load) of the overlay network node can be realized in a case where the flow filtering rule is updated from multiple nodes capable of using a plurality of flows especially with respect to the overlay network which supplies a flow filtering service.

BEST MODE FOR CARRYING OUT THE INVENTION

Embodiments of the present invention will hereinafter be described with reference to the drawings.

Figure 1:
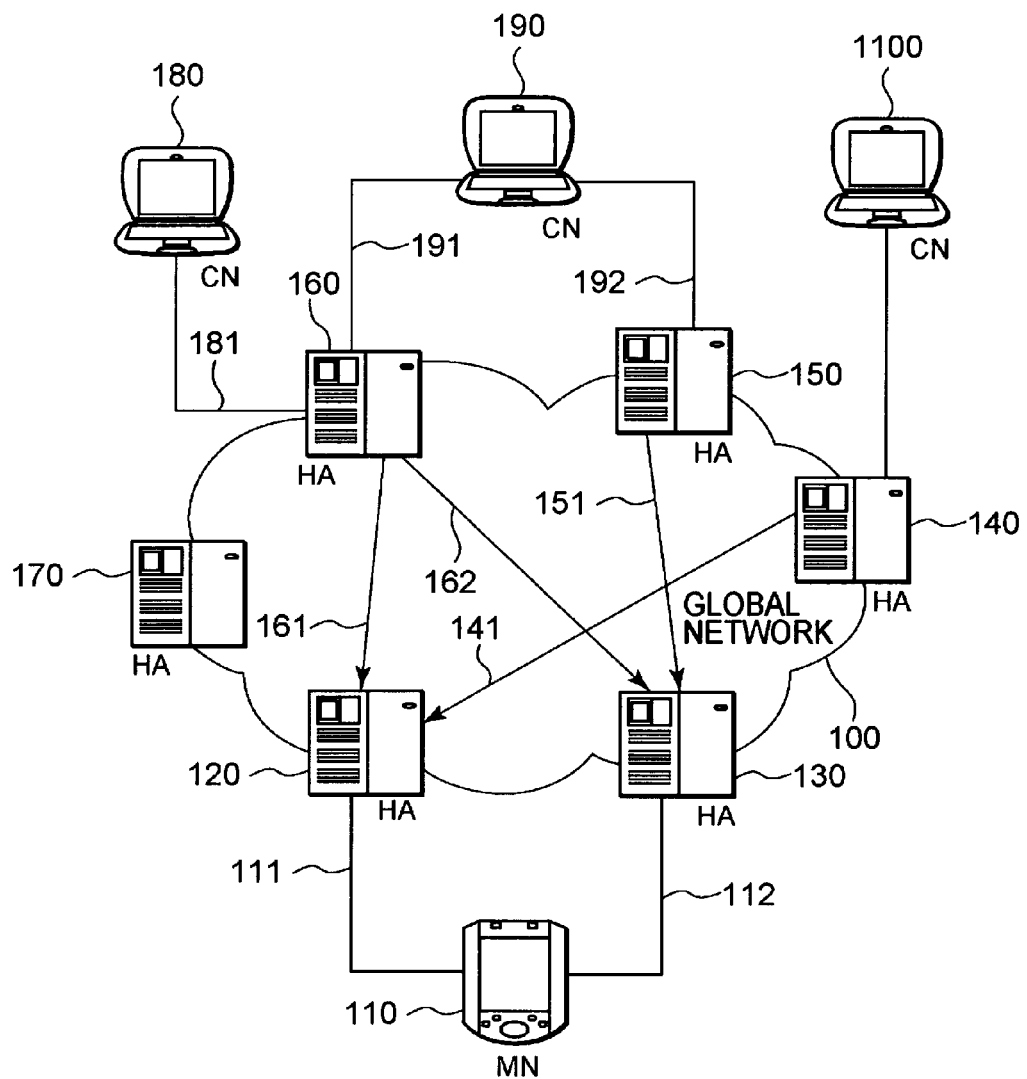
FIG. 1 is a diagram showing one example of a network constitution according to an embodiment of the present invention.

FIG. 1 is a diagram showing one example of a network constitution according to an embodiment of the present invention. In the network constitution shown in FIG. 1, at an overlay network constituted on a global network 100, a plurality of home agents (HAs 120, 130, 140, 150, 160 and 170) are present. A mobile node 110 has already subscribed for a service of this overlay network.

In addition to functions of standard IPv6, MIPv6 and the like, these home agents are provided with functions concerning Monami6 (a function of registering a plurality of care-of addresses in Monami6, a data flow filtering function), a path optimizing function on the overlay network and the like.

Moreover, in FIG. 1, the mobile node 110 receives a data stream from three correspondent nodes (CNs) 180, 190 and 1100. The CN 190 has two paths 191, 192 for connection to the overlay network.

The mobile node 110 can register an interface using paths 111, 112 by use of a protocol stack of Monami6. The mobile node 110 can designate a manner of transferring data streams from the CNs 180, 190 and 1100. As shown in FIG. 1, for example, the mobile node 110 can designate the data stream from the CN 180 so that the stream is transferred via a path 161 from an HA 160 and the path 111 from the HA 120, the node can designate, for the data stream from the CN 190, the path 161 from the HA 160 to the HA 120 and the path 111, a path 162 from the HA 160 to the HA 130 and the path 112, and a path 151 from the HA 150 to the HA 130 and the path 112, and the node can designate, for the data stream from the CN 1100, a path 141 from the HA 140 to the HA 120 and the path 111.

Here, there is considered a case where the mobile node 110 transfers the data streams from the CNs 180, 1100 via the path 111, and transfers the data stream from the CN 190 via the path 112.

According to a conventional technology, the mobile node 110 transmits a binding update message to the overlay network via the path 111 to the HA 120 or the path 112 to the HA 130. This binding update message requests registration of a plurality of care-of addresses, and may further include a flow filtering rule.

Moreover, in the conventional technology, for example, in a case where the HA 120 receives the binding update message, the HA 120 verifies that the binding update message has a normal state, and broadcasts, in the overlay network, the plurality of care-of addresses and a set of information of the flow filtering rule of the mobile node 110.

Since the amount of flow filtering rules for each mobile node is enormous, the consumption of resources per home agent resultantly indicates an enormous amount. For example, the home agent needs to store the flow filtering rules of all the mobile nodes which have subscribed for the overlay network, and needs to spend a processing time for checking all data packets based on a long list of the flow filtering rules.

On the other hand, according to the present invention, the HA which understands an operation of the present invention selects an appropriate HA, and the mobile node can update the flow filtering rule with respect to the selected HA only. According to the operation of the present invention, for example, in FIG. 1, only HA 160 is updated with the flow filtering rule concerning the CN 180. Similarly in FIG. 1, the flow filtering rule concerning the CN 190 are updated in HAs 150, 160 only, and the flow filtering rule concerning the CN 1100 can be updated within HA 140 only.

Moreover, when the HA 120 executes the operation of the present invention to receive the binding update message, the HA 120 first verifies that the received binding update message has the normal state. Then, the information of the plurality of care-of addresses concerning the mobile node 110 is transmitted to the overlay network according to, for example, the existing conventional technology.

Subsequently, the HA 120 scrutinizes the flow filtering rule requested from the mobile node 110 to judge the HA concerning the request in the overlay network (the HA in which the flow filtering rule is to be updated). For example, with respect to communication between the mobile node 110 and the CN 190, one or more HAs (e.g., the HA 150 or 160) might be present concerning each flow filtering rule. Then, the HA 120 updates each corresponding flow filtering rule with respect to the concerned HAs (e.g., the HAs 140, 150 and 160).

Next, a new message for use in the operation of the present invention will be described. It is to be noted that the new message is not necessarily required, and it can be judged based on an actual operation whether or not the new message is used. The message described hereinafter includes important information elements required for the operation of the present invention. It is to be noted that the message may be integrated with the existing protocol message of, for example, a mobile IP, an internet control and management protocol (ICMP) or the like or replaced with the message, as long as a purpose and an effect of the message can be realized. In the present invention, an update message defined by a flow filtering protocol of Monami6 or another flow filtering protocol that realizes a similar operation may be reused. It is to be noted that here the description is omitted, but a purpose and a structure (involved information) of the message described hereinafter are not basically changed even in a case where the message is integrated with any message or reused.

Figure 2:
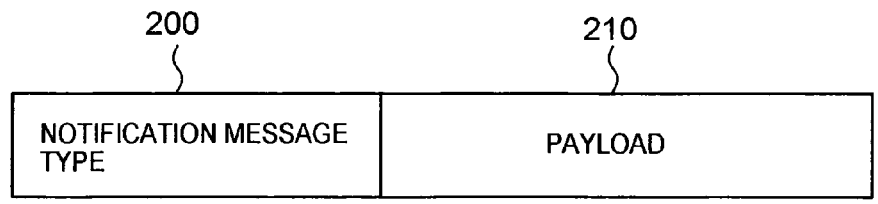
FIG. 2 is a diagram schematically showing one example of information included in a notification message according to the embodiment of the present invention.

FIG. 2 is a diagram schematically showing one example of information included in a notification message according to the embodiment of the present invention. FIG. 2 shows a format of the notification message.

This notification message is used in order to transmit a part or all of the flow filtering rules required by the mobile node 110 from a certain overlay network node to another overlay network node. The notification message is usually transmitted to a central controller (e.g., a primary HA of the mobile node) of the mobile node 110 or a multicast group of a controller node, but may be broadcasted over the whole overlay network.

In FIG. 2, a notification message type field 200 (a notification message type is described in FIG. 2) is used in order to indicate that this message is the notification message. A payload field 210 (a payload is described in FIG. 2) has a variable length, and this payload field 210 includes the flow filtering rule requested from the mobile node 110.

It is to be noted that during implementation, the notification message may be realized by reusing the message of the existing flow filtering protocol. However, it is necessary to constitute a format in which, when a receiver of this message cannot record the rule included in the message (the receiver of the message cannot correctly grasp the rule included in this message), it is notified that the receiver needs to perform a further operation. Especially, the receiver of this message may start the operation according to the present invention to request, for example, a notification message of such a format that the included flow filtering rule can be grasped.

Figure 3:
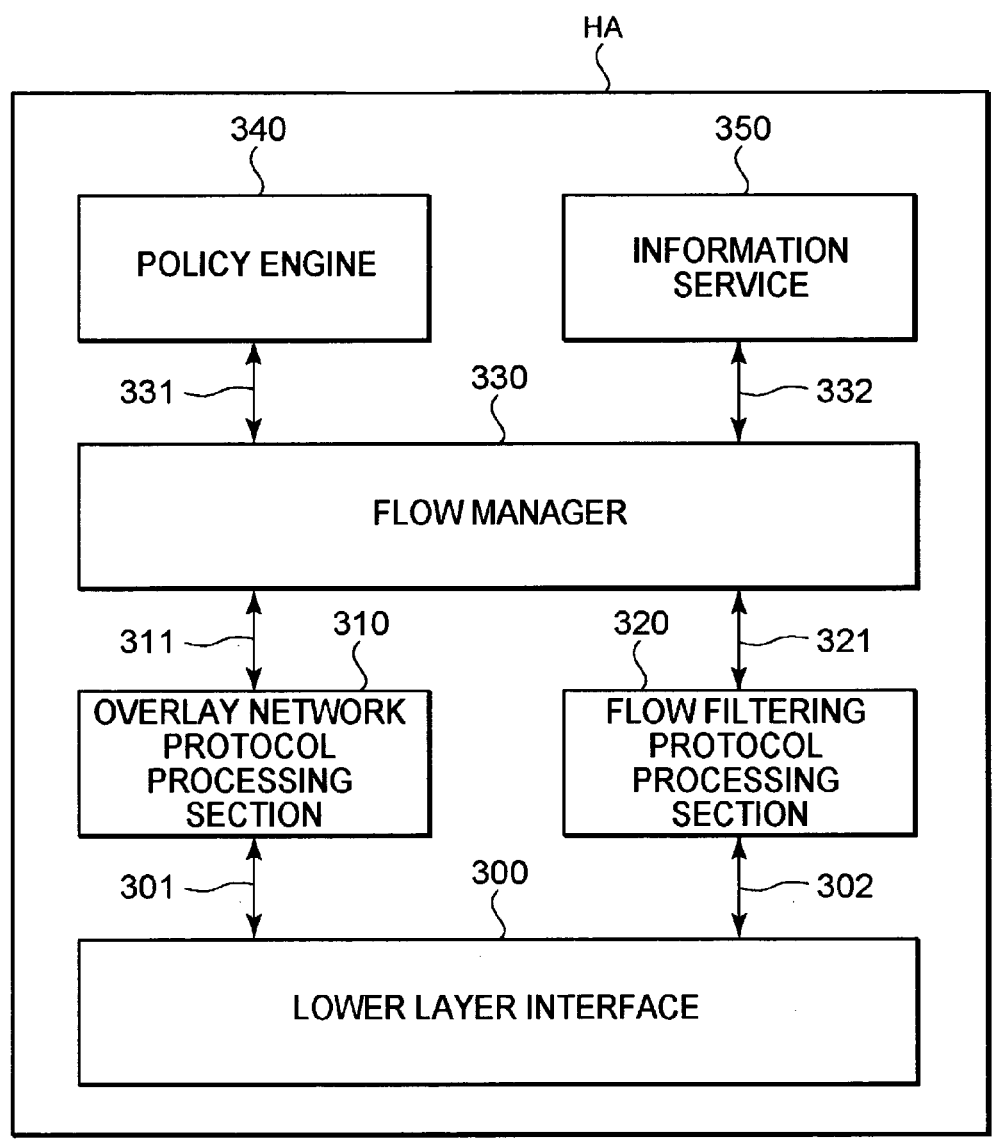
FIG. 3 is a block diagram showing functions of a home agent according to the embodiment of the present invention.

Moreover, in order to carry out the operation according to the present invention, some new functions need to be introduced into the home agent. FIG. 3 is a block diagram showing functions of the home agent according to the embodiment of the present invention. FIG. 3 shows the functions required for the home agent according to the present invention as functional blocks.

A lower layer interface 300 includes one or a plurality of physical network access cards, a driver of the card and a software application programming interface (API). The message to be input and output with respect to the network is transferred to protocol stacks via the lower layer interface 300. For example, the messages are transferred to an overlay network protocol processing section 310 via a path 301 and to a flow filtering protocol processing section 320 via a path 302. It is assumed here that a part of Monami6 functions (a flow filtering function of Monami6) is included in the flow filtering protocol processing section 320 which is a flow filtering protocol stack.

Moreover, a flow manager 330 is an entity having a function of performing a main operation according to the present invention. The flow manager 330 receives messages according to the present invention from the overlay network protocol processing section 310 through a path 311 and from the flow filtering protocol processing section 320 through a path 321, respectively. The flow manager 330 is connected to a policy engine 340 via a path 331. It is to be noted that the policy engine 340 may be present on a remote site.

When the home agent of the overlay network receives the flow filtering rule from the mobile node 110 or receives the notification message shown in FIG. 2, an operation of the flow manager 330 is started. The flow manager 330 scrutinizes the flow filtering rules in order to specify the home agent which belongs to the overlay network and which needs to be updated. Then, the flow manager 330 updates the selected home agent or the agent having a concerned flow filtering rule by use of an appropriate flow filtering protocol according to the concerned flow filtering rule.

Moreover, the flow manager 330 may be constituted so that the flow filtering rule can be rewritten from a certain protocol to another type of protocol. It is to be noted that this rewriting may be performed for reasons such as a policy and a capability, or for such a reason that the flow filtering protocol 320 (the protocol before changed) of the selected home agent is not supported in the agent.

Furthermore, as one example of the operation of the flow filtering protocol of Monami6, there might occur a case where the mobile node 110 transmits three flow filtering rules to three CNs (the CNs 180, 190 and 1100), respectively. In this case, a target flow is specified based on the rule by use of an address of each CN.

It is to be noted that the flow manager 330 may first inquire the policy engine 340 through the path 331 to determine a policy of an operation, for example, whether or not to start the above-mentioned operation or broadcast the information by a usual method. Here, in a case where the policy engine 340 determines that the present invention should be used, the flow manager 330 may ask a question concerning the concerned home agent of the overlay network by use of an information service 350 through a path 332.

Here, there is a possibility that a reply is obtained from the information service 350, which indicates that the HA 140 has to be used with respect to the CN 1100, the HAs 150, 160 have to be used with respect to the CN 190, and the HA 160 has to be used with respect to the CN 180. At this time, the flow manager 330 of each of the HAs 140, 150 and 160 instructs, through the path 321, the flow filtering protocol processing section 320 to prepare and transmit a message which notifies the flow filtering rule. After a series of processing are completed, in a case where this home agent is not the home agent selected concerning the CN, this home agent does not have to retain the flow filtering rule from the mobile node 110, and the flow filtering rule from the mobile node 110 is discarded.

Moreover, the policy engine 340 is a local repository or a remote repository of a rule and a policy for performing selection processing of the home agent to be updated with respect to a specific flow filtering rule. The information service 350 is a local or remote database for supplying static or quasi-static network information such as network topology and network characteristic. It is to be noted that the remote information service is introduced into, for example, a technology of IEEE802.21.

Figure 4:
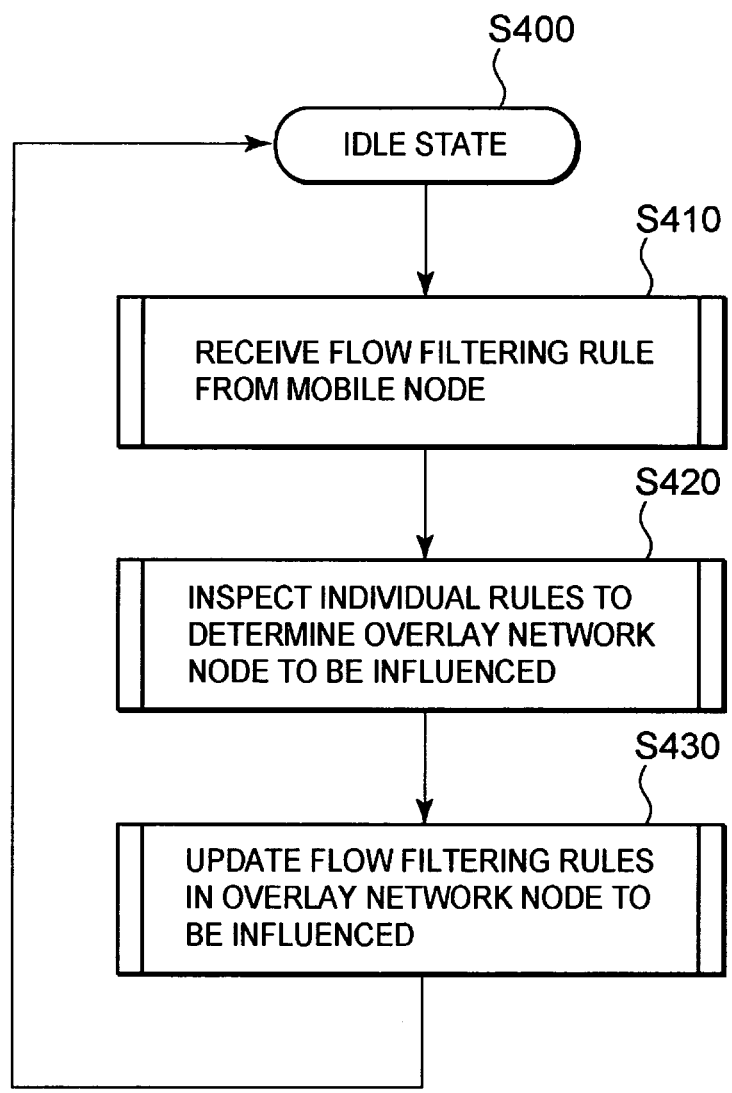
FIG. 4 is a flow chart showing one example of an operation of the home agent according to the embodiment of the present invention.

Furthermore, FIG. 4 is a flow chart showing one example of an operation of the home agent according to the embodiment of the present invention. FIG. 4 shows an outline of the operation of the home agent according to the present invention.

In the flow chart shown in FIG. 4, as an initial state, a case where the home agent has an idle state (step S400) is assumed. On receiving the message which requests the function of flow filtering from the mobile node 110, the home agent verifies validity and authenticity of this message, and then extracts the flow filtering rule included in this message (step S410).

Subsequently, the home agent inquires the policy engine 340 about a correct operation procedure (e.g., whether or not to perform the operation according to the present invention). For example, in a case where it is determined by the policy that the home agent executes the operation according to the present invention, the home agent inspects the flow filtering rules to determine the overlay network node to be influenced (step S420). It is to be noted that at this time, the overlay network node to be influenced may be described further with respect to information stored in the information service 350.

It is to be noted that in the step S420, as the overlay network nodes to be influenced, there are specified the overlay network nodes via which the packet of the data stream corresponding to the flow filtering rule is transferred in the overlay network, for example, an overlay network node which receives the packet from the CN or the mobile node from the outside of the overlay network, an overlay network node which connects the overlay network node on a CN side to that on a mobile node side (for packet transfer), and the like.

Then, after acquiring a list of the overlay network nodes to be influenced determined in the step S420 and the concerned flow filtering rules, the home agent updates the concerned flow filtering rule with respect to the only network node (i.e., the overlay network node to be influenced) (step S430). Then, after the processing is completed, the home agent discards the original message (the message received from the mobile node in the step S410) or uses the message in updating the agent itself (especially a case where all the information is used in updating the agent itself will be described later in a persistent home agent) if necessary, thereby returning to the idle state (step S400).

It is to be noted that the flow chart shown in FIG. 4 shows an operation in a case where the home agent of the overlay network which has received the flow filtering rule from the mobile node 110 selects the home agent (the target HA) to be updated based on this flow filtering rule to prepare and transmit the notification message individually including the information necessary for updating each target HA.

However, the overlay network node corresponding to each mobile node 110 may be determined beforehand, the home agent of the overlay network which has received the flow filtering rule from the certain mobile node 110 may first specify the overlay network node corresponding to the mobile node 110 to transfer the whole flow filtering rule received from the mobile node 110, and in the overlay network node corresponding to the mobile node 110, the appropriate target HA may be selected and each target HA may be updated. The home agent of the overlay network which has received the flow filtering rule from the certain mobile node 110 may select the appropriate target HA, quickly update each target HA by itself and transfer the whole flow filtering rule received from the mobile node 110 to the overlay network node corresponding to the mobile node 110.

Figure 5:
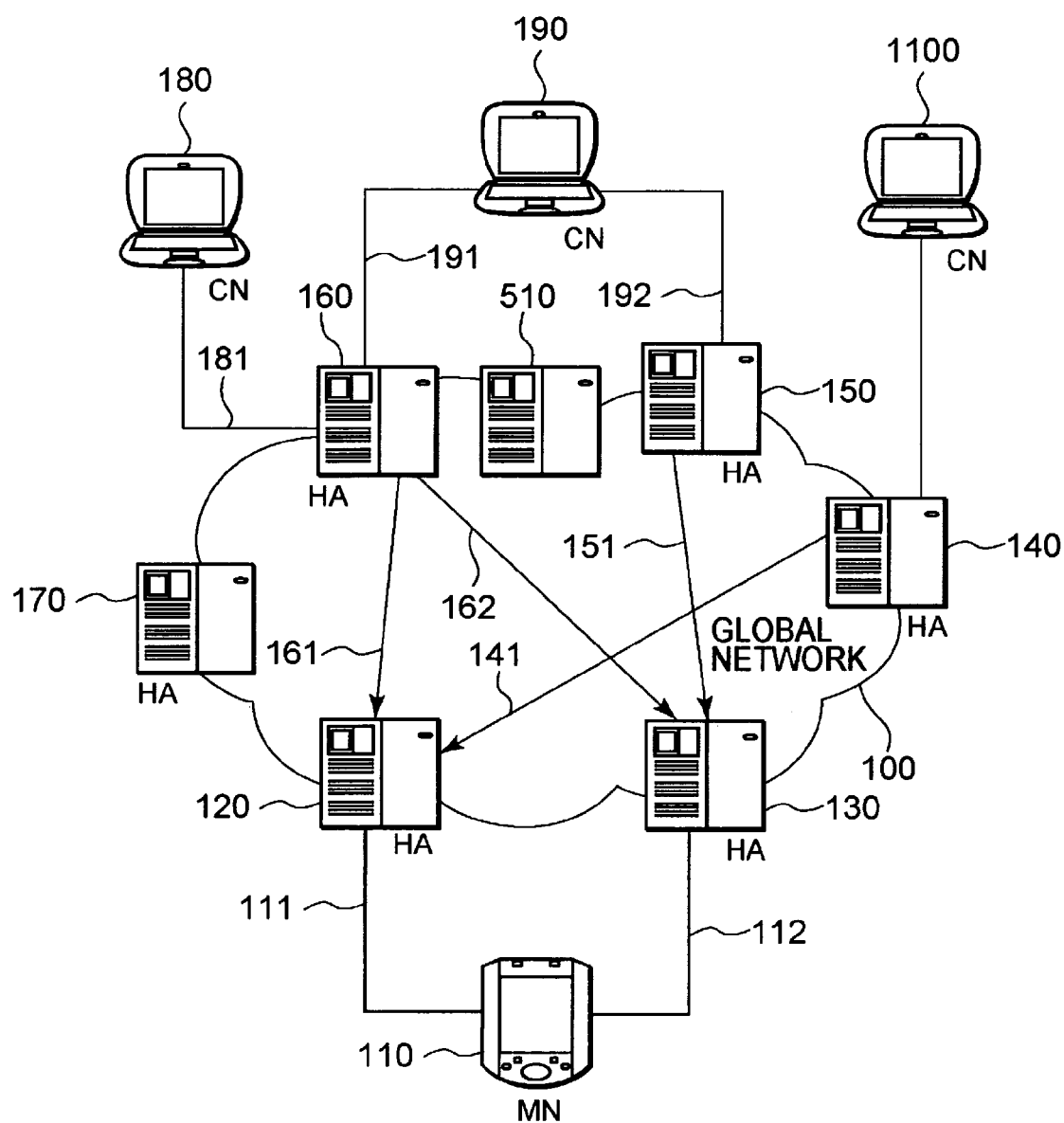
FIG. 5 is a diagram showing another example of the network constitution according to the embodiment of the present invention.

FIG. 5 is a diagram showing one example of the network constitution according to the embodiment of the present invention. The network constitution shown in FIG. 5 is substantially the same as that shown in FIG. 1, but an overlay network constituted on a global network 100 is further provided with a node which functions as a persistent home agent (PHA) 510.

The PHA 510 is a network node corresponding to a certain mobile node (here a mobile node 110 is assumed), and is a node which functions as a central controller of the mobile node 110. It is to be noted that a primary home agent of the mobile node 110 may perform an operation as the PHA 510. According to this constitution, for the mobile node 110, the PHA 510 still performs communication as the home agent, and another home agent (HA 120, 130, 140, 150, 160 or 170) present in the overlay network is not actually recognized by the mobile node 110. It is to be noted that such an arrangement of the PHA 510 corresponding to the mobile node 110 is already realized according to the conventional technology.

On receiving a message including a flow filtering rule from the mobile node 110, the HA 120 or 130 inquires a policy engine 340 about a procedure to be performed next. In a case where the policy engine 340 judges that this flow filtering rule has to be transmitted to the persistent home agent, the home agent performs processing to specify the persistent home agent of the mobile node 110.

Subsequently, a notification message to be transmitted to the specified persistent home agent (i.e., the PHA 510) is prepared. As shown in FIG. 2, this notification message has the payload field 210, and the whole flow filtering rule received from the mobile node 110 is inserted into this payload field 210. The PHA 510 which has received this notification message performs processing concerning the flow filtering rule included in the notification message according to the above-mentioned processing (processing based on the flow chart shown in FIG. 4), and resultantly the only concerned home agent is updated.

It is to be noted that the persistent home agent can be realized by, for example, the same device as the primary home agent of the mobile node 110, but a function of the persistent home agent according to the present invention and a function of the primary home agent of the mobile node 110 may separately be arranged.

The primary home agent might already be assigned by an overlay network protocol 310, but when the persistent home agent is realized by an entity different from that of this primary home agent, positional information of the persistent home agent needs to be acquired in the overlay network.

For example, a central server may function as the persistent home agent with respect to any mobile node in order that the positional information of the persistent home agent corresponding to the mobile node 110 can be acquired in the overlay network. The central server may store mapping information of the mobile node and the persistent home agent, whereby a correspondence between the mobile node and the persistent home agent can be grasped by inquiry to the central server. Alternatively, the central server broadcasts the above mapping information in the overlay network, so that all the overlay network nodes may retain the mapping information.

A constitution in which the above-mentioned persistent home agent of the mobile node is arranged is useful in a case where an index-based flow filtering protocol is used. This means that the mobile node does not stipulate the flow filtering rule and that the node successively updates the flow filtering rule by use of a format of an index.

The mobile node 110 specifies, for example, a flow coming first from a CN 180, and assigns, to the flow, an index in terms of a simple numeric value or the like, whereby the flow can subsequently be specified by use of the index in an update message or a maintenance message. At this time, in a case where the flow filtering rule has been processed with a different home agent before, the home agent which has newly received the update message or the maintenance message cannot specify a place where the flow filtering rule has been present before. However, the persistent home agent is introduced, whereby the flow filtering rule is once transferred to the persistent home agent, and a problem of concern in a case where an index space is managed does not occur.

As described above, when the persistent home agent is introduced, the above-mentioned operation according to the present invention can be performed. The home agent which has received the message from the mobile node may transmit the update message associated with the index to the persistent home agent by use of notification message. In this case, the persistent home agent has a function of updating the flow filtering rule locally held by the persistent home agent itself in the same manner as in another concerned overlay network node.

Moreover, the home agent which has received the message from the mobile node may perform communication with the persistent home agent, acquire the indexed flow filtering rule to update the flow filtering rule, and then update the flow filtering rules in the persistent home agent and another concerned home agent.

Furthermore, all the flow filtering rules may be transferred to the central server, and processed by the central server. In this case, the central server has a function of interpreting or distributing the flow filtering rule. In the constitution shown in FIG. 5, assuming that the PHA 510 functions as the central server of the overlay network, the flow filtering rule received from an arbitrary mobile node by use of the overlay network is first transferred to the PHA 510 by the notification message. Then, the PHA 510 performs the above-mentioned processing, interprets the flow filtering rule, selects the concerned HA, and selectively distributes the flow filtering rule required for each HA.

In addition, according to a further embodiment of the present invention, in the same manner as in the above-mentioned selective updating method of the flow filtering rule, the HA which understands the present invention may assign (distribute) paths in an overlay network concerning a mobile node having a plurality of interfaces.

For example, as shown in FIG. 1, it is assumed that the overlay network is notified that the mobile node 110 uses two available paths (the paths 111, 112). In a legacy overlay network (the overlay network according to a conventional technology), information on two paths (the paths 111, 112) is propagated to all the home agents (the HAs 120, 130, 140, 150, 160 and 170) in the overlay network. That is, in the legacy overlay network, the information indicating that the mobile node 110 can use two paths 111, 112 is propagated to the whole overlay network.

On the other hand, in the present invention, when, for example, the HA 120 receives binding update concerning the paths 111, 112, the HA 120 can selectively determines a path suitable for each overlay network node to perform notification (the update of the paths). It is to be noted that as references of the selective update of the path, arbitrary requirements such as a cost, a present load on a link and a usable band width are referred.

For example, there is considered a case where the path 111 is updated for the HAs 120, 160 and 170, whereas the path 112 is updated for the HAs 130, 140 and 150. That is, according to the present invention, although the mobile node 110 can use two paths 111, 112, path information is selectively updated at each overlay network node, and each overlay network node does not have to retain information which resultantly becomes unnecessary.

In a case where the flow filtering rule is selectively distributed in the above embodiment, when the path is selectively distributed, the HA 120 needs to consider the already set requirements of the flow filtering rule. That is, it is not preferable that, for example, the path in which the flow filtering rule is set is carelessly deleted by the selective path distribution.

At this time, the HA 120 may already grasp the flow filtering rule of the mobile node 110, or inquire an external server or an external service about the information on the flow filtering rule of the mobile node 110. It is to be noted that examples of a destination of the inquiry about such information includes the above-mentioned persistent home agent (the PHA 510).

Moreover, in a case where the overlay network node having both of the function of selectively distributing the flow filtering rule and the function of selectively distributing the path receives the flow filtering rule, the overlay network node may perform processing to inquire the network whether or not to hold path information on the mobile node in an incomplete state. It is to be noted that in a case where the path is selectively distributed, there is a possibility that the overlay network node only partially retains the path information on the mobile node. This inquiry may be performed with respect to, for example, the external server or the external service, and examples of the destination of the inquiry about such information include the above-mentioned persistent home agent (the PHA 510). It is to be noted that the path of the mobile node may be estimated from the received flow filtering rule, and in this case, the query does not have to be necessarily performed.

Figure 6:
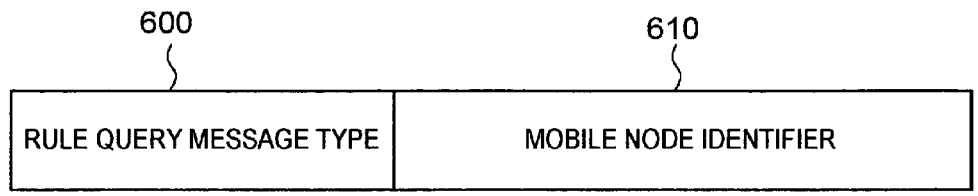
FIG. 6 is a diagram schematically showing one example of information included in a rule query message according to a further embodiment of the present invention.

FIG. 6 is a diagram schematically showing one example of information included in a rule query message according to a further embodiment of the present invention. FIG. 6 shows a format of the rule query message.

This rule query message is used in order to perform the inquiry about the flow filtering rule concerning a specific mobile node. It is to be noted that the rule query message may be transmitted to a central controller (e.g., the persistent home agent shown in FIG. 5) concerning the mobile node or a multicast group of a controller node, or may be broadcasted over the whole overlay network.

In FIG. 6, a rule query message type field 600 (a rule query message type is described in FIG. 6) is used in order to indicate that this message is the rule query message. A mobile node identifier field 610 (a mobile node identifier is described in FIG. 6) is used in order to designate a specific mobile node concerning this query. It is to be noted that the rule query message may be realized by reusing or expanding the existing protocol message.

Figure 7:
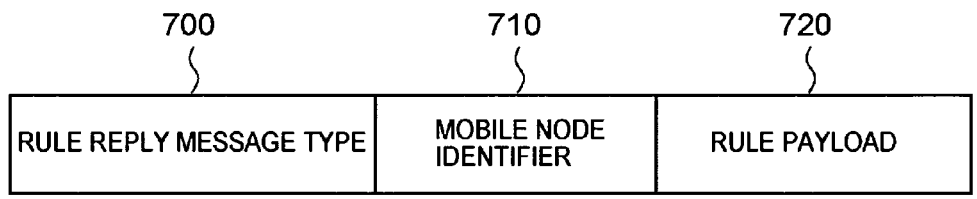
FIG. 7 is a diagram schematically showing one example of information included in a rule reply message according to the further embodiment of the present invention.

Moreover, FIG. 7 is a diagram schematically showing one example of information included in a rule reply message according to the further embodiment of the present invention. FIG. 7 shows a format of the rule reply message.

This rule reply message is transmitted in a case where a reply is made to the received rule query message, and the message notifies a result with respect to the inquiry about the flow filtering rule concerning the specific mobile node.

In FIG. 7, a rule reply message type field 700 (a rule reply message type is described in FIG. 7) is used in order to indicate that this message is the rule reply message. A mobile node identifier field 710 (a mobile node identifier is described in FIG. 7) is used in order to designate the specific mobile node concerning this reply. It is to be noted that a value corresponding to the mobile node identifier field 610 of the rule query message is set to the mobile node identifier field 710. A rule payload field 720 (a rule payload is described in FIG. 7) has a variable length, and this rule payload field 720 includes all flow filtering rules already requested by the mobile node. It is to be noted that the rule reply message may be realized by reusing or expanding the existing protocol message.

Figure 8:
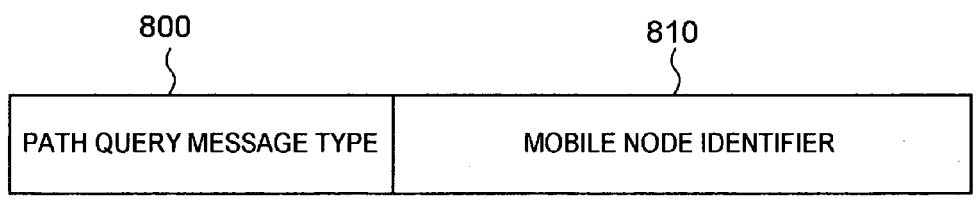
FIG. 8 is a diagram schematically showing one example of information included in a path query message according to the further embodiment of the present invention.

Moreover, FIG. 8 is a diagram schematically showing one example of information included in a path query message according to the further embodiment of the present invention. FIG. 8 shows a format of the path query message.

This path query message is used in order to perform inquiry about a path to a specific mobile node. It is to be noted that the path query message may be transmitted to a central controller (e.g., the persistent home agent shown in FIG. 5) concerning the mobile node and a multicast group of a controller node, or may be broadcasted over the whole overlay network.

In FIG. 8, a path query message type field 800 (a path query message type is described in FIG. 8) is used in order to indicate that this message is the path query message. A mobile node identifier field 810 (a mobile node identifier is described in FIG. 8) is used in order to designate a specific mobile node concerning this query. It is to be noted that the path query message may be realized by reusing or expanding the existing protocol message.

Figure 9:
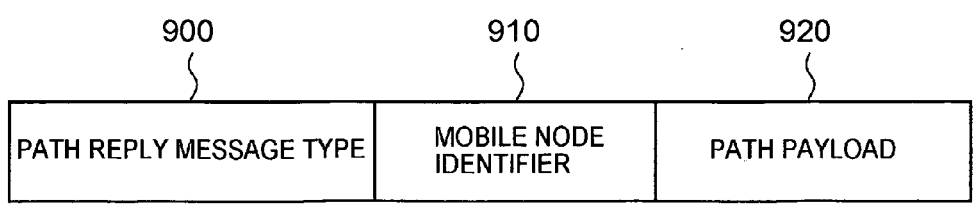
FIG. 9 is a diagram schematically showing one example of information in a path reply message according to the further embodiment of the present invention.

Furthermore, FIG. 9 is a diagram schematically showing one example of information included in a path reply message according to the further embodiment of the present invention. FIG. 9 shows a format of the path reply message.

This path reply message is transmitted in a case where a reply is made to the received path query message, and the message notifies a result with respect to the inquiry about the path concerning the specific mobile node.

In FIG. 9, a path reply message type field 900 (a path reply message type is described in FIG. 9) is used in order to indicate that this message is the path reply message. A mobile node identifier field 910 (a mobile node identifier is described in FIG. 9) is used in order to designate the specific mobile node concerning this reply. It is to be noted that a value corresponding to the mobile node identifier field 810 of the path query message is set to the mobile node identifier field 910. A path payload field 920 (a path payload is described in FIG. 9) has a variable length, and this path payload field 920 includes all paths to the specific mobile node which can be grasped by a person who makes the reply. It is to be noted that the path reply message may be realized by reusing or expanding the existing protocol message.

Moreover, in the above-mentioned examples of the messages, a procedure for obtaining all flow filtering rules and path information of the specific mobile node has been described, but the mobile node may request a central controller concerning the mobile node to transmit (update) the only flow filtering rule and path information judged to be necessary for the mobile node itself.

Furthermore, not only a query/reply procedure with respect to the central controller is performed but also a procedure of notifying (updating) the flow filtering rule and the path information with respect to the specific overlay network node may be performed by the central controller as the case may be. For example, irrespective of the presence of a movement event of the mobile node, it is possible to cope with a case where a CN which is to perform communication with the mobile node (or a CN with which the mobile node is to newly perform communication) is generated. When a packet from the CN (or a packet to the CN) reaches the overlay network node, this overlay network node does not know a destination of connection of the MN (or only knows a path having a state which is not optimum for transfer), and there is therefore a possibility that the primary home agent or the overlay network node which is not optimum for the transfer is selected to transfer the packet. At this time, instead of notifying that the primary home agent or the overlay network node which is not optimum for the transfer should obtain (update) the flow filtering rule and the path information, the central controller notifies (updates) the flow filtering rule and the path information, whereby a correct flow filtering rule and correct path information are notified (updated) from the central controller.

Figure 10:
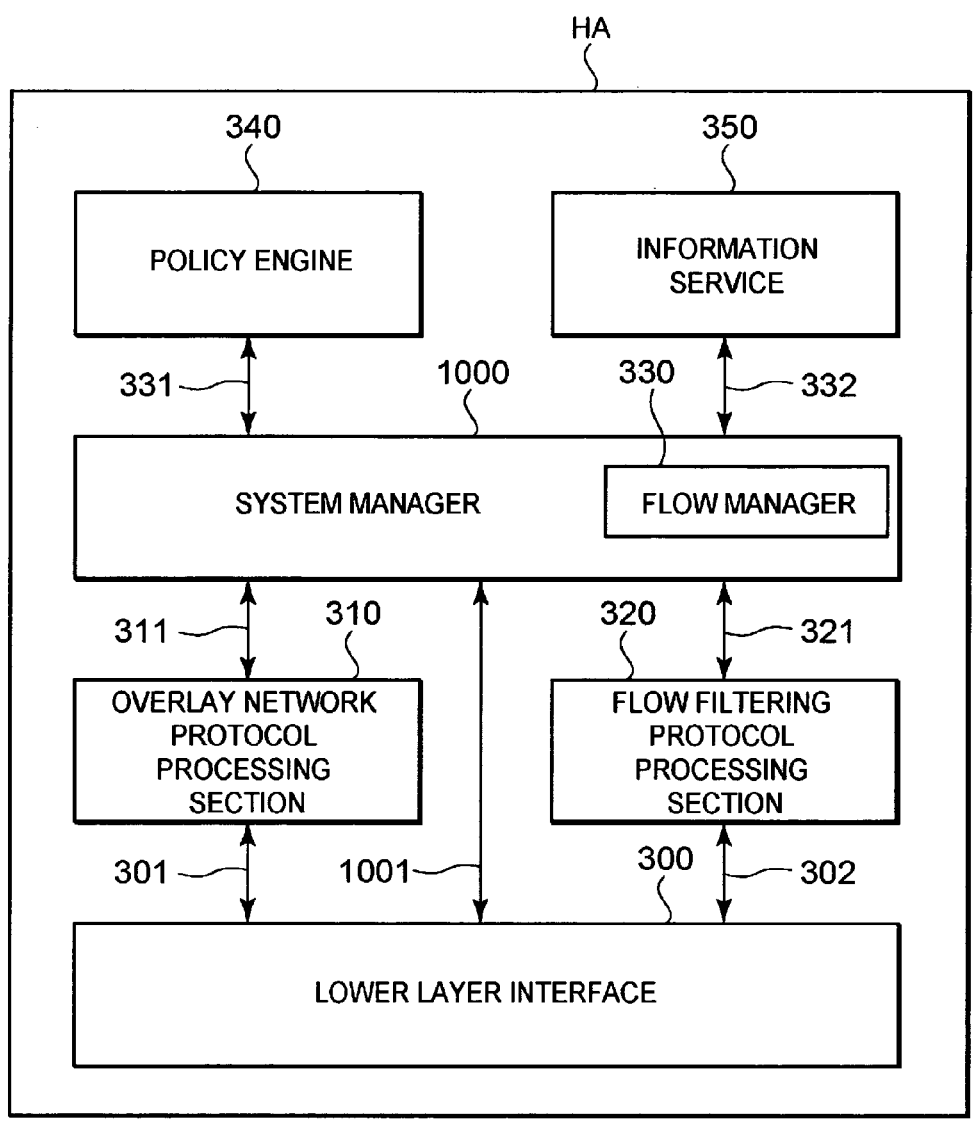
FIG. 10 is a block diagram showing functions of a home agent according to the further embodiment of the present invention.

Moreover, FIG. 10 is a block diagram showing functions of the home agent according to the further embodiment of the present invention. FIG. 10 shows, as functional blocks, functions required for the home agent which operates as the overlay network node in realizing selective path distribution (assignment of paths). It is to be noted that most of constituting elements shown in FIG. 10 are the same as those of the home agent which operates as the overlay network node shown in FIG. 3, and newly added or changed portions only will be described.

An entity of a system manager 1000 is newly added to a home agent shown in FIG. 10. It is to be noted that as shown in FIG. 10, the system manager 1000 is connected to an overlay network protocol processing section 310 through a path 311, to a flow filtering protocol processing section 320 through a path 321, to a policy engine 340 through a path 331 and to an information service 350 through a path 332, and the manager may directly be connected to a lower layer interface 300 through a path 1001.

Moreover, the flow manager 330 is constituted so as to form a part of the system manager 1000 or closely communicate with the system manager 1000. In a case where the system manager 1000 is separated from the flow manager 330, the system manager 1000, it needs to be constituted that the system manager 1000 can inquire the flow manager 330 about the filtering rule concerning the specific mobile node. The system manager 1000 may receive the above-mentioned concerned message from the overlay network protocol processing section 310 via the path 311, or from the flow filtering protocol processing section 320 via the path 321 or may directly be received from the lower layer interface 300 via the path 1001. The policy engine 340 connected to the system manager 1000 via the path 331 may be arranged at a remote site.

The system manager 1000 starts an operation thereof in a case where the home agent of the overlay network receives update concerning routing and flow filtering rule from the mobile node 110.

The system manager 1000 first judges whether or not the path needs to be added in a case where the flow filtering rule is received from the mobile node 110. In this judgment, to judge based on the flow filtering rule whether or not appropriate path information is included in the presently retained path information on the mobile node 110 is a basic judgment reference in a case where a packet is transferred to a specific interface of the mobile node 110 (a path connected to the interface). If the above-mentioned appropriate path information is not included, the appropriate path information needs to be acquired or added. As a material of the judgment, for example, there is usable the presence of various information (or values corresponding to the information) such as CoA and path of the mobile node 110 designated by the flow filtering rule and a path to a node (a home agent) in another overlay network as a transfer destination. It is to be noted that additional path information may be acquired from the flow filtering rule itself, or acquired from an arbitrary external information source by use of the path query message/the path reply message. Then, the system manager 1000 transfers the received flow filtering rule to the flow manager 330. In the flow manager 330, processing described in the above embodiment is performed.

Moreover, in a case where the update concerning the path is received from the mobile node 110, the system manager 1000 checks the respective paths to determine the home agent in the overlay network corresponding to the path to be changed, which needs to be updated. It is to be noted that examples of a method of checking the path include a method in which the system manager 1000 checks whether or not the path can support a quality of service (QoS). Then, the system manager 1000 updates the home agent of each overlay network concerning the associated path by use of an overlay network protocol and another appropriate path distribution protocol.

Figure 11:
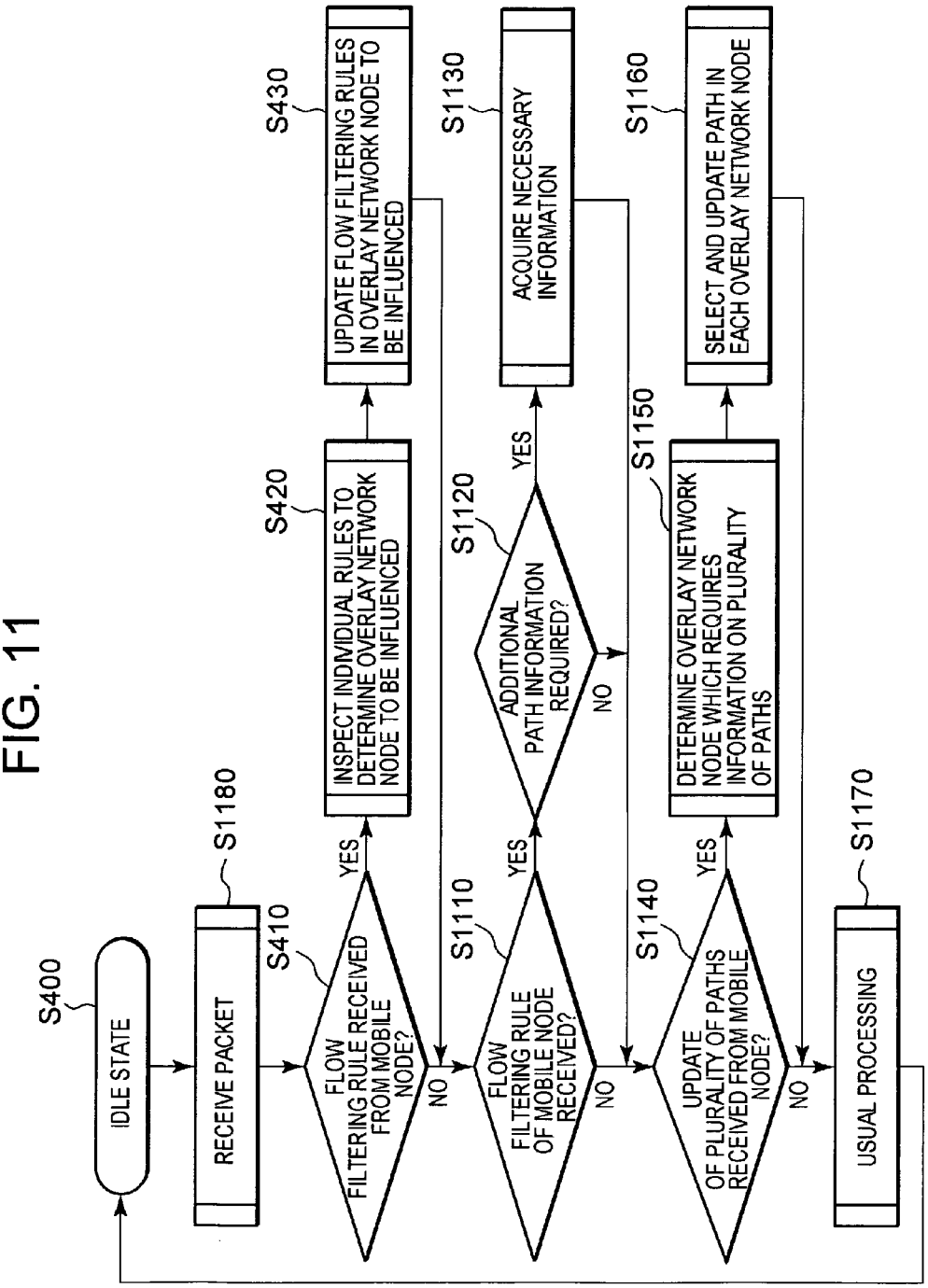
FIG. 11 is a flow chart showing one example of an operation of the home agent according to the further embodiment of the present invention.

Furthermore, FIG. 11 is a flow chart showing one example of an operation of the home agent according to the further embodiment of the present invention. FIG. 11 shows an outline of one example of an operation of the system manager 1000 shown in FIG. 10. It is to be noted that in the further embodiment of the present invention, execution of selective path update is added to the algorithm shown in FIG. 4. It is to be noted that the same steps as those shown in FIG. 4 are denoted with the same reference numerals, and description thereof is omitted.

In the flow chart shown in FIG. 11, a case where the home agent has an idle state (step S400) is assumed as an initial state. At this time, in a case where a packet is input into the system manager 1000 (step S1180), the system manager 1000 first judges whether or not the packet is a packet transmitted from the mobile node 110 and including the flow filtering rule (step S410). Here, when this packet is the packet transmitted from the mobile node and including the flow filtering rule, processing similar to the method described with reference to FIG. 4 is performed (steps S420, S430).

Subsequently, the system manager 1000 judges whether or not this packet is a packet transmitted from the mobile node overlay network node and including the flow filtering rule concerning the mobile node (step S1110). Then, in a case where this packet is the packet transmitted from the overlay network node and including the flow filtering rule, the system manager 1000 judges whether or not the additional path information is necessary in order to execute the requested flow filtering rule (step S1120). If the additional information is necessary, the system manager 1000 performs processing to acquire the additional information by inquiring, for example, an external node or an external service or by use of another arbitrary means (step S1130).

Furthermore, the system manager 1000 checks whether or not this packet is a packet including update concerning a plurality of paths and directly received from the mobile node (step S1140). Then, in a case where this packet is the packet transmitted from the mobile node and including the update concerning the plurality of paths, the system manager 1000 determines the overlay network node which requires update information concerning the plurality of paths (step S1150). It is to be noted that in this processing, the filtering rule already set by the mobile node may be referred. Then, the system manager 1000 selects the path in each overlay network node to update the path (step S1160).

It is to be noted that in the steps S1150, S1160, for example, the update concerning the plurality of paths from the mobile node is not transmitted as it is to all the overlay network nodes, and the paths are selectively updated, so that saving of resources of each overlay network node, reduction of loads and the like are realized. Furthermore, after the each above-mentioned processing, the packet is subjected to usual processing (step S1170).

Next, an operation of the overlay network in a case where legacy processing is performed will be compared with that of the overlay network in a case where the present invention is used, and advantages in the case where the present invention will be described.

In the constitution shown in FIG. 1, when the legacy operation is performed, the HA 170 needs to store the paths (the paths 111, 112) of the mobile node 110. On the other hand, in the operation of the present invention, the HA 170 has only one path to the MN 110. It is to be noted that the correct paths stored in the HA 170 are determined according to the policy of the overlay network.

In the legacy operation, when the packet for the MN 110 arrives, the HA 170 performs processing of each usable path to check the filtering rule concerning each path. Then, when both the paths (the paths 111, 112) are found, the HA 170 checks whether or not the filtering rule is matched. Here, when the filtering rule is not matched, the HA 170 needs to determine the path to be used. It is to be noted that this processing is repeatedly performed with respect to each packet, every time the packet is input. As the list of the paths lengthens in accordance with the number of the subscribers' mobile nodes, the number of the interfaces or the like, a waiting time until the next hop of the transfer destination of the certain packet is determined also increases. Moreover, this requires a memory and a cache for storing a large number of paths.

On the other hand, in the operation of the present invention, the HA 170 has only one path to the MN 110. In consequence, processing at the destination of the next hop of the transfer destination can be reduced, the required memories and caches are reduced, and response during the processing of the data packet improves.

Moreover, during the selective path distribution according to the present invention, the operation (the operation described with reference to FIG. 5) according to the central controller concerning the flow filtering rule is easily applicable. Since the information on the mobile node is constantly found in the primary home agent and the persistent home agent 510 (a device arranged at a well-known position), the operation of the central controller has an advantage that management is facilitated. In consequence, it is not necessary to perform inquiry about the information on the MN 110 by broadcasting or multicasting, and transmission efficiency in the overlay network improves. It is to be noted that in such an operation, all query messages need to be transmitted to the PHA 510, and the PHA 510 needs to make a reply to the query by the reply message. The PHA 510 may select the path to be distributed to the overlay network node.

Furthermore, as another method of optimizing the operation of the central controller, the PHA 510 may retain, in a memory, a result concerning each path registered in the MN 110. Then, in a case where the mobile node 110 performs usual update, when the path is not changed, the PHA 510 may reuse the existing result. For example, in a case where the path 111 is not changed but the path 112 is changed, the PHA 510 reuses the previous result concerning the path 111, whereas the PHA needs to reevaluate the path distribution of the path 112.

In addition, in an operation mode of the central controller, the PHA 510 performs processing for the mobile node at one place in a concentrated manner. Therefore, it is preferable to prepare, for example, a preliminary server, a backup server or the like in which the same information as that of the PHA 510 is constantly updated. Moreover, in a case where generation of a trouble is expected, the PHA 510 may transfer, for example, a context to transfer, to another device, a part or all of the processing for the mobile node. It is to be noted that this processing may be performed based on, for example, load balancing, policy or the like.

It is to be noted that the present invention may be changed in consideration of not only the flow filtering rule and the path assignment in the overlay network but also another inefficient function which is to be used by the mobile node but which is not scalable. Examples of such a function include QoS assured path information and another information which depends on topology. As an example concerning the QoS, there is considered a case where the mobile node 110 makes a request so as to establish the QoS assured path between the CN 1100 and the node itself. However, at this time, all the HAs (the HAs 120, 130, 140, 150, 160, 170 and 510) do not have to reserve the network resource of this path, and the resource may be reserved by the operation according to the present invention in the HAs 120 and 140 only.

It is to be noted that in the present description, the present invention is illustrated and described with due consideration so that the present invention provides the most practicable and preferable embodiment, but it is apparent for any person skilled in the art that the present invention may variously be changed without departing from the scope of the present invention with respect to design and parameter details concerning the flow manager 330 and another constituting element.

It is to be noted that the respective functional blocks used in the above embodiments of the present invention are typically realized as large scale integration (LSI) which is an integrated circuit. These blocks may individually be formed into one chip, and one chip may be constituted so as to include a part or all. It is to be noted that here the LSI has been described, but the integration is sometimes referred to as an integrated circuit (IC), system LSI, super LSI or ultra LSI, depending on a difference of an integration degree.

Moreover, a technique of forming the integrated circuit is not limited to LSI, and may be realized by a circuit for exclusive use or a processor for general use. There may be used a field programmable gate array (FPGA) which can be programmed after the manufacturing of the LSI or a reconfigurable processor in which connection and setting of circuit cells in the LSI can be reconstituted.

Furthermore, if a technology of forming the integrated circuit appears in which the LSI is replaced with another technology advanced or derived from a semiconductor technology, needless to say, the functional blocks may be integrated using the technology. For example, there is a possibility of application of a biological technology or the like.

INDUSTRIAL APPLICABILITY

The present invention has an effect that scalability in an overlay network system can be improved to efficiently supply a service with respect to a user and an effect that reduction of the number of messages to be transmitted in an overlay network and saving of resources (a memory and a processing load) of an overlay network node can be realized in a case where a flow filtering rule is updated from multiple nodes capable of using a plurality of flows especially with respect to the overlay network which supplies a flow filtering service, and the present invention is applicable to a technical field concerning an overlay network in which a packet interchangeable data communication network such as an IP network is abstracted.

The invention claimed is:

1. An overlay network node which belongs to an overlay network formed at a host of a predetermined network and which has a function concerning a specific overlay network service, the overlay network node comprising:
    a message receiving unit for receiving, from a predetermined end node or another overlay network node, a message indicating that the predetermined end node which receives the specific overlay network service requests a function concerning the specific overlay network service;
    a request interpreting unit for interpreting a request from the predetermined end node with reference to information included in the message;
    a determination unit for determining which overlay network node among overlay nodes in the overlay network is concerned with the request based on an interpretation result of the request by the request interpreting unit;
    a selection unit for selecting an overlay network node to which the information included in the message is configured to be distributed to based on a determination result by the determination unit, so that at least one overlay network node among the overlay network nodes is not selected; and
    a transmission unit for transmitting the information included in the message to the selected overlay network node, wherein:
    the information of the message includes a flow filtering rule to designate a processing method of a data packet flow, the selected overlay network node being updated with respect to the flow filtering rule.

2. The overlay network node according to claim 1, further comprising a sorting unit for sorting information necessary for the selected overlay network node from the information included in the message, wherein
    the transmission unit is configured to transmit the information sorted from the information included in the message to the selected overlay network node.

3. The overlay network node according to claim 1, wherein the message transmitted from the predetermined end node which receives the specific overlay network service is a message which requests a service concerning functions of multiple interfaces.

4. The overlay network node according to claim 1, wherein the data packet flow is managed based on an index, and an index value to specify the data packet flow and the flow filtering rule to designate the processing method of the data packet flow specified based on the index value are included in the message.

5. The overlay network node according to claim 1, wherein the overlay network node is configured to supply the flow filtering rule to an overlay network node to be influenced in a case where the flow filtering rule included in the message is executed in the overlay network.

6. The overlay network node according to claim 1, further comprising a judging unit for judging whether or not additional path information is necessary in order to execute the flow filtering rule included in the message.

7. The overlay network node according to claim 1, wherein the message transmitted from the predetermined end node which receives the specific overlay network service is a message which requests a QoS assurance service.

8. The overlay network node according to claim 1, wherein the message transmitted from the predetermined end node which receives the specific overlay network service is a message requesting that a plurality of packet transmission paths to the predetermined end node be set.

9. The overlay network node according to claim 8, wherein the overlay network node is configured to determine an overlay network node which is configured to selectively distribute a part of all of the plurality of packet transmission paths to the predetermined end node identified in the message and configured to supply, to the determined overlay network node, information on a part or all of the plurality of corresponding packet transmission paths.

* * * * *